United States Patent [19]

Yasukawa

[11] Patent Number: 5,749,004
[45] Date of Patent: May 5, 1998

[54] OPTION SETTING DEVICE AND METHOD OF OPERATING SAME FOR USE WITH A CAMERA

[75] Inventor: Seiichi Yasukawa, Yotsukaido, Japan

[73] Assignee: Nikon Corporation, Tokyo, Japan

[21] Appl. No.: 810,592

[22] Filed: Mar. 4, 1997

Related U.S. Application Data

[63] Continuation of Ser. No. 524,572, Sep. 7, 1995, abandoned.

[30] Foreign Application Priority Data

Oct. 31, 1994 [JP] Japan ................... 6-266833

[51] Int. Cl.⁶ .................................. G03B 7/26
[52] U.S. Cl. ........................... 396/280; 396/301
[58] Field of Search ..................... 396/280, 301, 396/310

[56] References Cited

U.S. PATENT DOCUMENTS

| | | | |
|---|---|---|---|
| 4,733,265 | 3/1988 | Haraguchi et al. | 354/484 |
| 5,049,917 | 9/1991 | Yasukawa et al. | 354/484 |
| 5,079,585 | 1/1992 | Yamada | 354/484 |
| 5,081,483 | 1/1992 | Ishimura et al. | 354/484 |
| 5,136,327 | 8/1992 | Ogawa | 354/484 |
| 5,150,147 | 9/1992 | Kobayshi et al. | 354/484 |
| 5,315,345 | 5/1994 | Kawasaki et al. | 354/484 |
| 5,500,710 | 3/1996 | Saito et al. | 354/484 |

*Primary Examiner*—Safet Metjahic
*Assistant Examiner*—Michael Dalakis

[57] ABSTRACT

An option setting device for use with a camera includes a power supply unit supplying power to the option setting device, a microcomputer controlling the operations of the camera. A RAM stores option settings set by the microcomputer, while a non-volatile memory unit also stores the option settings set by the microcomputer. A normal reset generation unit generates a normal reset signal to reset the microcomputer after the introduction of power by the power supply unit, and an emergency reset generation unit generates an emergency reset signal to reset the microcomputer after an interruption of power from the power supply unit. A reset type discrimination unit determines after a reset has occurred whether the reset was caused by the normal reset generation unit or by the emergency reset generation unit and in the case that the reset type discrimination unit determines that the reset was caused by normal reset generation unit the contents of the non-volatile memory unit are transmitted to the RAM, and in the case that the reset type discrimination unit determines that the reset was by the emergency reset generation unit the microcomputer preserves the contents of the RAM without transmitting the contents of the non-volatile memory unit to the RAM. A method of operating the option setting device is also described.

15 Claims, 5 Drawing Sheets

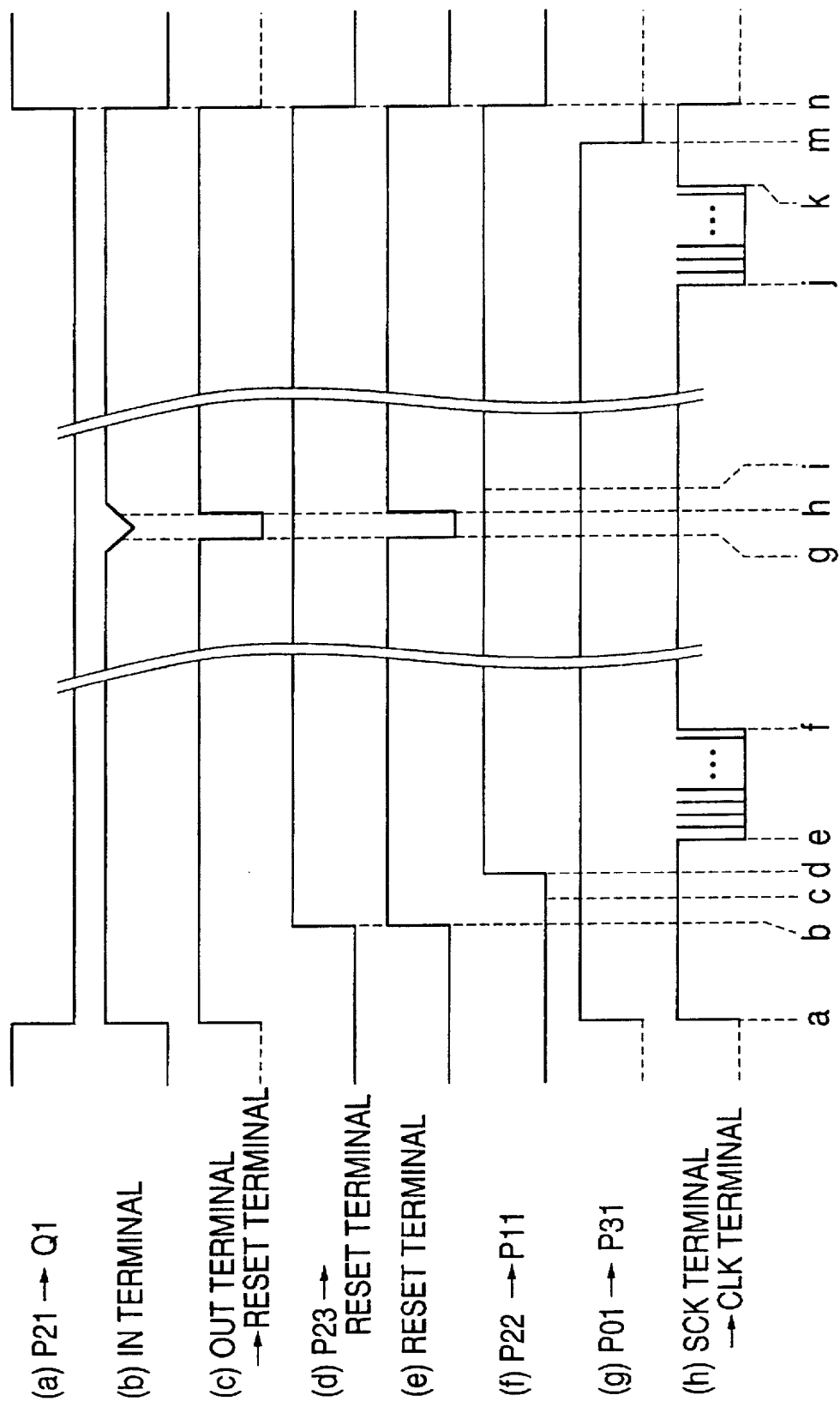

OPTION SETTING DEVICE AND METHOD OF OPERATING SAME FOR USE WITH A CAMERA

This application is a continuation of application Ser. No. 08/524,572, filed Sep. 7, 1995, now abandoned.

BACKGROUND OF THE INVENTION

1. Field of the Invention

The present invention relates to an option or information setting device and a method of operating the same for use with a camera and, more particularly, to such a device and a method that allow camera options to be reliably set regardless of power source interruptions and anomalies.

2. Description of the Related Art

Typically, optional camera operation parameters and option settings (e.g., zoom state, flash state, f-stop, etc.) selected by a user of a camera are stored in a random access memory unit (RAM) maintained in the camera. Accordingly, the camera is configured to operate based upon the settings selected by the user which are stored in the RAM.

The RAM in which such settings are stored, retains its contents as long as a power supply is provided. But, when a power supply has been temporarily interrupted (e.g., as a result of battery cycles and the like), such stored settings are disrupted and often lost. At best, the stored settings become uncertain. Because of this problem, camera manufacturers typically use non-volatile memory devices, such as EEPROMs and the like, which can be electrically written and erased.

When a power supply is supplied to a microcomputer and to a RAM in a conventional camera, the contents of an EEPROM are configured to be transmitted to the RAM for subsequent camera operational control. During the provision of a power supply, the microcomputer permits the changing of each camera setting that is stored in the RAM, and in addition, controls each operation of the camera based on the information stored in the RAM. Before the power supply is interrupted (e.g., such as before a battery anomaly), the stored contents of the RAM are transmitted to the EEPROM.

The reason why RAMs are used instead of EEPROMs, is because EEPROMs are much slower than RAMs. That is, EEPROMS offer the advantage of non-volatility, but the disadvantage of slow access during reading and writing operations.

The components of a typical camera are often powered by batteries. Accordingly, when such batteries become exhausted or drained they are not reliable as power sources. In particular, in cases of a voltage drop of a built-in flash, mirror up and down operations, film winding and the like, such batteries are often overloaded. As such, the power source voltage falls to a voltage lower than that at which the microcomputer can appropriately operate. When such a situation occurs, anomalous operation of the camera results.

In order to prevent the problems associated with battery drains and proper camera operation, various solutions have been offered to monitor a camera's power supply voltage. When such voltages are determined to fall below a predetermined threshold value, a reset operation is carried out by the camera's microcomputer. Such a reset operation often involves an emergency-like camera operation wherein all camera functions are halted. As such, many photographic settings and photographs are lost.

Moreover, the signal to start the operation of transmitting the contents of the EEPROM (i.e., user selected camera operational settings) to the RAM on introduction of a power supply (e.g., when a camera is turned ON), is a reset signal accompanying the power supply introduction by way of circuitry that governs the power supply. This operation is termed a "normal reset", and such a normal reset and the previously mentioned emergency reset operation become inputs to the microcomputer of a camera.

The two kinds of reset operations (i.e., normal reset and emergency reset) have been treated without distinction as "resets." Accordingly a microcomputer in the case that the reset signals are input to the microcomputer, both cause the stored contents of the EEPROM to be transmitted to the RAM. Because of such an operation, the normal reset operation that caused the contents of the EEPROM to be transmitted to the RAM is obviated when an emergency reset operation has to be carried out (i.e., the contents of the RAM are again re-written with previously set factory settings and the like). As such, if a user has just selected his camera's operational settings and an emergency reset operation has to be carried out (i.e., in the case of a low battery determination), such settings are lost.

SUMMARY OF THE INVENTION

Accordingly, it is an object of the present invention to solve the aforementioned problems associated with the prior art.

It is another object of the present invention to provide an option or information setting device for use in a camera that allows camera users to reliably set operational parameters regardless of power interruptions and anomalies.

It is still another object of the present invention to provide an option setting device for use in a camera that allows camera users to reliably set operational parameters regardless of power interruptions and anomalies that result from battery drains and the like.

It is yet a further object of the present invention to provide an option setting device for use in a camera that allows a camera user to reliably set operational parameters regardless of whether a camera has been turned off during camera operations.

It is still another object of the present invention to provide a method for operating an option setting device for use in a camera and that allows a camera user to reliably set operational parameters regardless of camera power interruptions and anomalies.

It is still yet another object of the present invention to provide a method for operating an option setting device for use in a camera and that allows a camera user to reliably set operational parameters regardless of camera battery drains and the like.

Objects of the present invention are achieved by providing an option setting device for use with a camera that includes a power supply unit supplying power to the option setting device, a microcomputer controlling the operations of the camera, a RAM storing option settings set by the microcomputer, a non-volatile memory unit storing the option settings set by the microcomputer, a normal reset generation unit generating a normal reset signal to reset the microcomputer after the introduction of power by the power supply unit, an emergency reset generation unit generating an emergency reset signal to reset the microcomputer after an interruption of power from the power supply unit and a reset type discrimination unit determining after a reset has occurred whether the reset was caused by the normal reset generation unit or by the emergency reset generation unit and in the case that the reset type discrimination unit determines that the reset is caused by normal reset generation unit the contents of the non-volatile memory unit are transmitted to the RAM, and in the case that the reset type discrimination unit determines that the reset is by the emergency reset generation unit the microcomputer preserves the contents of the RAM without transmitting the contents of the non-volatile memory unit to the RAM.

Objects of the present invention are further achieved by providing a method of operating an option setting device of a camera that includes the steps of receiving and storing a set of operational options in a non-volatile memory as selected by a camera user, resetting the option setting device after a power interruption, determining whether the resetting step was carried out normally or in an emergency, transmitting the operational options stored during the receiving and storing step to a volatile memory unit of the camera when it has been determined that the resetting step was carried out normally and preserving the contents of the volatile memory unit of the camera without transmitting the contents of the non-volatile memory unit to the volatile memory unit when it has been determined that the resetting step was carried out in an emergency.

Finally, objects of the present invention are still further achieved by providing a device for storing operational settings for use with a camera. The device includes a power supply supplying power to the device, a volatile memory unit storing the operational settings, a non-volatile memory unit storing the operational settings, a first resetting unit generating a first reset signal to reset the device after the power supply has supplied power to the device, a second resetting unit generating a second reset signal to reset the device after an interruption of power from the power supply and a reset type discrimination unit determining after a reset has occurred whether the reset was caused by the first or second resetting unit. In the case that the reset type discrimination unit determined that the reset was caused by the first resetting unit, the contents of the non-volatile memory unit are copied to the volatile memory unit. In the case that the reset type discrimination unit determined that the reset was by the second resetting unit the contents of the non-volatile memory unit are not copied to is the volatile memory unit.

BRIEF DESCRIPTION OF THE DRAWINGS

The aforementioned and other objects and advantages of the present invention will become apparent and more readily appreciated from the following description of the preferred embodiment, taken in conjunction with the accompanying drawings, of which:

FIG. 6 is a timing chart that illustrates the sequence of operations carried out by the components of the preferred embodiment of the present invention as shown in detail in FIG. 2.

DETAILED DESCRIPTION OF THE PREFERRED EMBODIMENT

Figure 1:
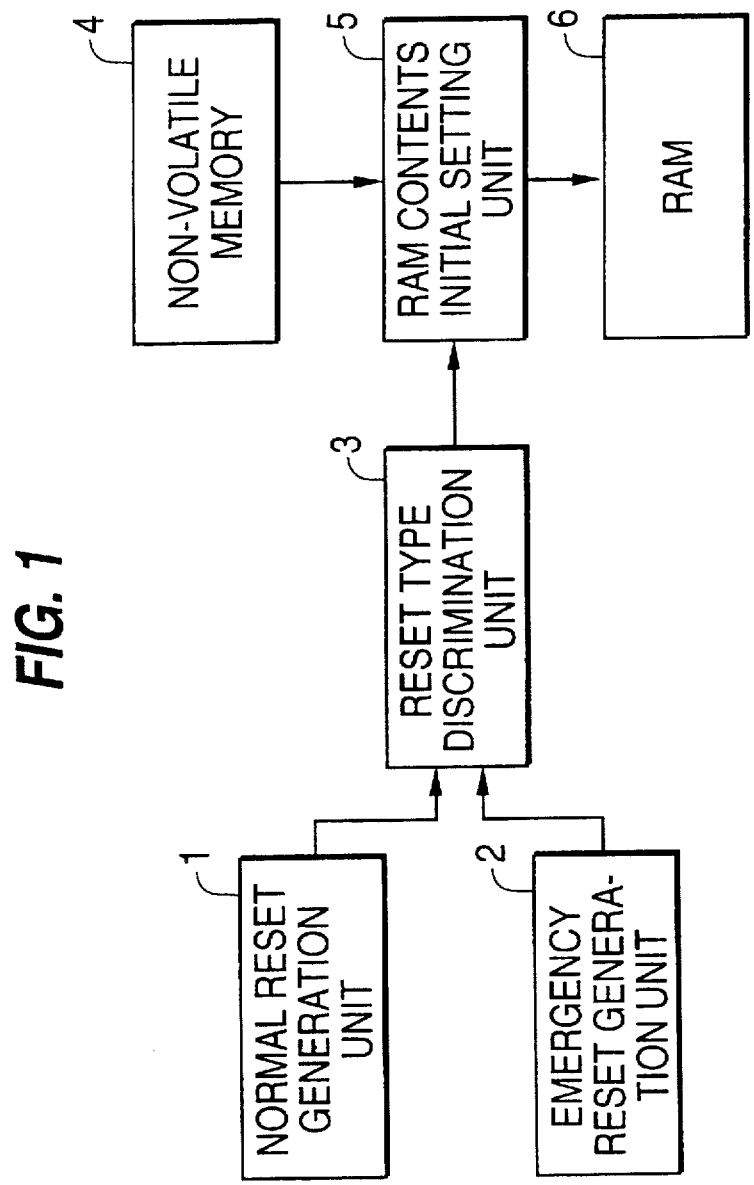
FIG. 1 is a block diagram that shows the essential components of an option setting device for use with a camera according to a preferred embodiment of the present invention.

Reference will now be made in detail to the present preferred embodiment of the present invention, examples of which are illustrated in the accompanying drawings, wherein like reference numerals refer to like elements throughout.

Referring now to FIG. 1, therein illustrated is a block diagram that shows the essential components of an option setting device for use with a camera according to a preferred embodiment of the present invention. A normal reset generation unit 1 corresponds to a first microcomputer and an emergency reset generation unit 2 corresponds to a voltage detector. Moreover, the reset type discrimination unit 3 is arranged in a second microcomputer and is used for determining the presence of various voltage levels. A non-volatile memory 4 corresponds to an EEPROM. A RAM contents initial setting unit 5 and a RAM 6 also are arranged in the second microcomputer. While the block diagram of FIG. 1 illustrates a presently preferred embodiment, the present invention is not to be limited by the structure illustrated therein. FIG. 1 is meant to provide an overall schematic diagram of the structures particularly illustrated in FIG. 2 and described herein.

Figure 2:
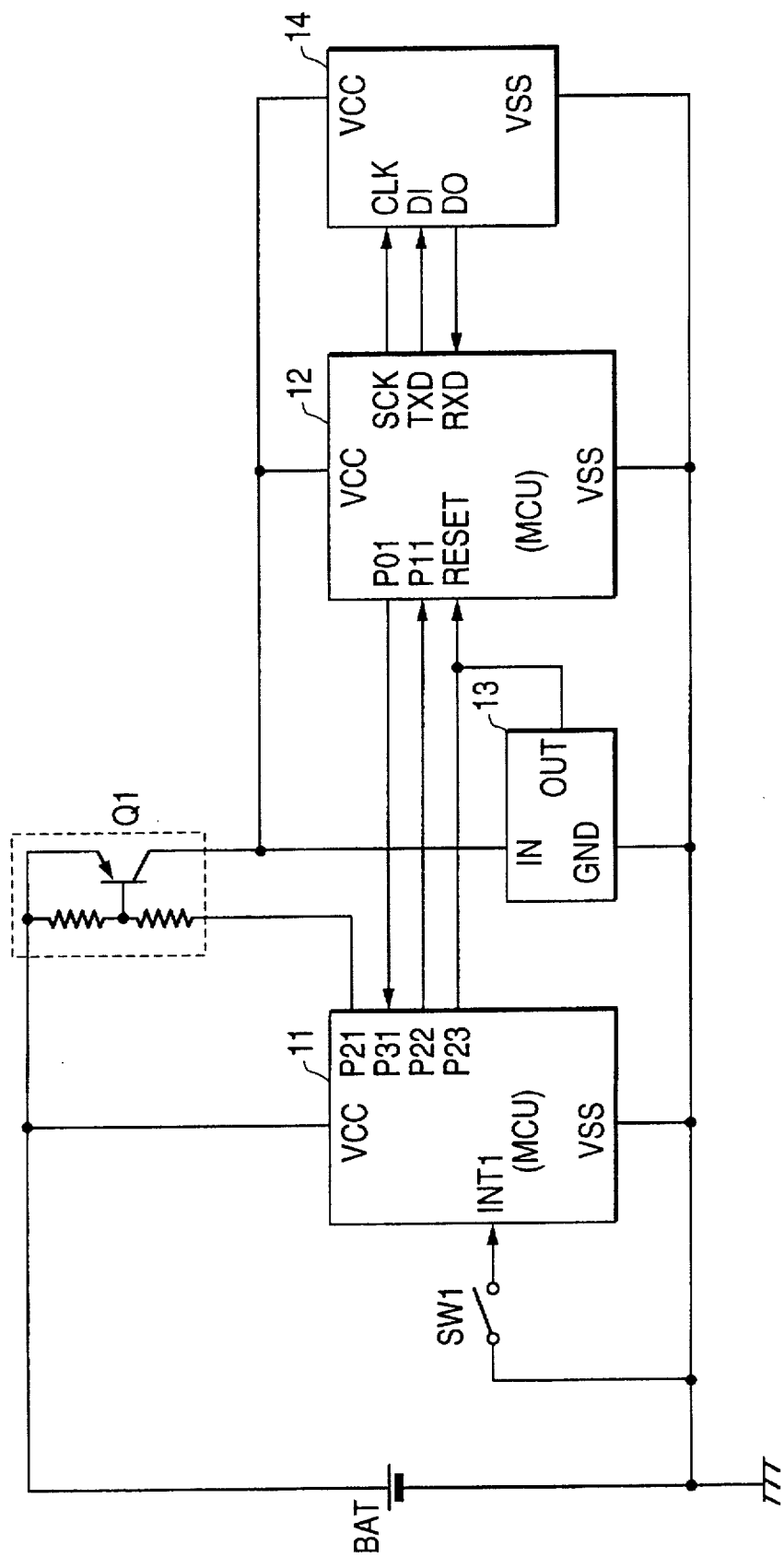
FIG. 2 is a circuit diagram that shows in detail the interconnections of the components of the option setting device shown in FIG. 1.

Referring now to FIG. 2, therein shown is a circuit diagram of the presently preferred embodiment of the present invention as shown in FIG. 1. The various connections at particular circuit points and ports (e.g., VCC, P21, P31, P22, P23, P01, P11, RESET, SCK, TXD, RXD, CLK, D1, DO, VSS, IN, GND, BAT, INT1, Q1 etc.) will be readily understood from the discussions of the presently preferred embodiment of the present invention that follow.

A battery BAT is the power supply for the circuit shown in FIG. 2. Moreover, a first microcomputer 11 (MCU 11) receives its power from battery BAT. A second microcomputer 12 (MCU 12), a voltage detector 13, and an EEPROM 14 are also supplied with power from battery BAT. Appropriate power is switched and sent to the aforementioned components via the resistors and transistors of pack Q1.

A switch SW1 is operated by a user and is coupled to MCU 11 via an external interrupt input port INT1 of MCU 11. MCU 11 controls the base terminal of pack Q1 by way of an output port P21. An input port P31 of MCU 11 is coupled to an output port P01 of MCU 12. Output ports P22, P23 of MCU 11 are respectively connected to input port P11 and reset terminal RESET of MCU 12. Moreover, the output terminal OUT of voltage detector 13 is connected to the output port P23 of MCU 11 and to the reset terminal RESET of MCU 12.

The output port P23 of MCU 11 and the output terminal OUT of the voltage detector 13 form an output configuration of an open drain type by way of respective parallel connections which cause low "L" voltage levels at the reset terminal RESET of MCU 12. Moreover, MCU 12 and EEPROM 14 are joined by three input/output ports constituting a serial circuit.

FIG. 6 is a timing chart that illustrates the operations of each component of the circuit shown in FIG. 2. In FIG. 6, (a) shows the output timing from the output port P21 of MCU 11 to pack Q11, (b) shows the input timing of the power supply input terminal IN of the voltage detector 13, (c) shows the output timing from the output terminal OUT of the voltage detector 13 to the reset terminal RESET of MCU 12 and (d) shows the output timing from the output port P23 of MCU 11 to the reset port RESET of MCU 12.

Moreover, in FIG. 6, (e) shows the input waveform of the reset terminal RESET of MCU 12 due to the various output results of MCU 11 and the voltage detector 13, (f) shows the output timing from the output port P22 of MCU 11 to the input port P11 of MCU 12 and (g) shows output timing from the output port P01 of MCU 12 to the input port P31 of MCU 11.

Additionally, in FIG. 6, (h) shows timing conditions that are realized to output a serial clock signal from the terminal SCK in order for MCU 12 to perform reading and writing with respect to EEPROM 14.

Figure 3:
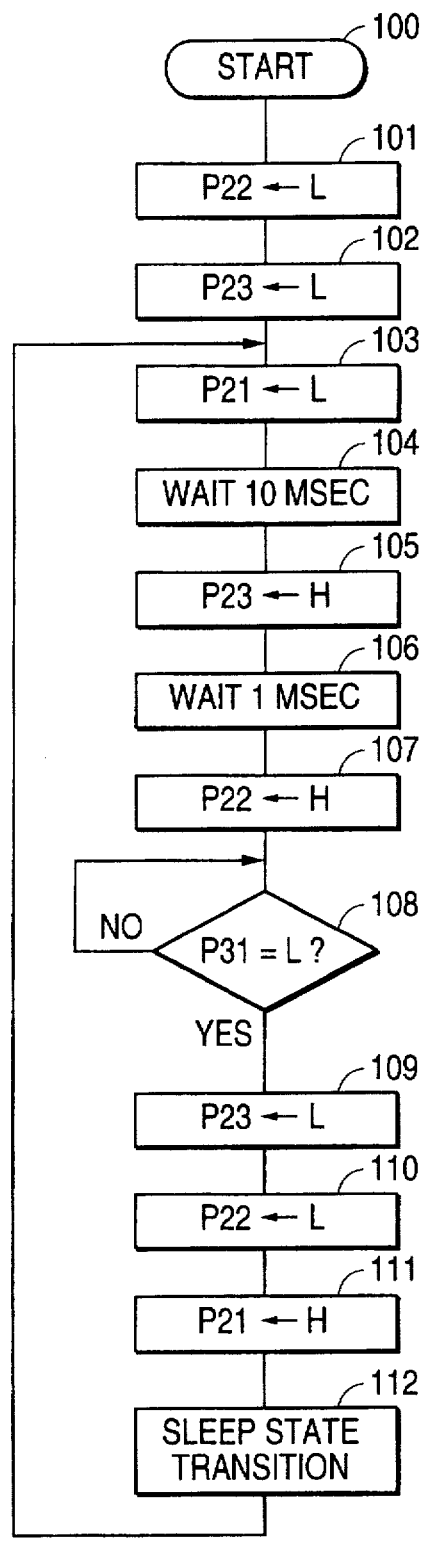
FIG. 3 is a flow chart that shows the operations of the first microcomputer shown in FIG. 2.
Figure 4:
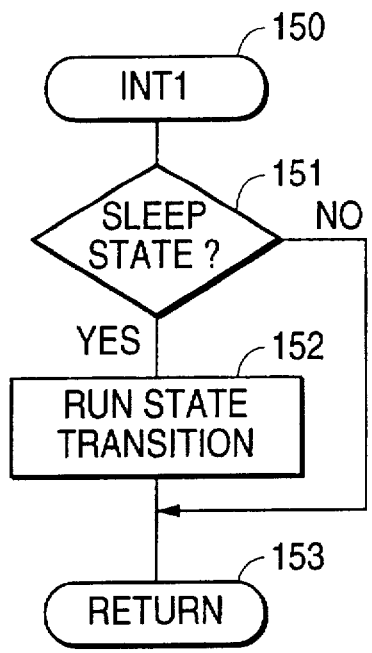
FIG. 4 is a flow chart that shows further operations of the first microcomputer.
Figure 5:
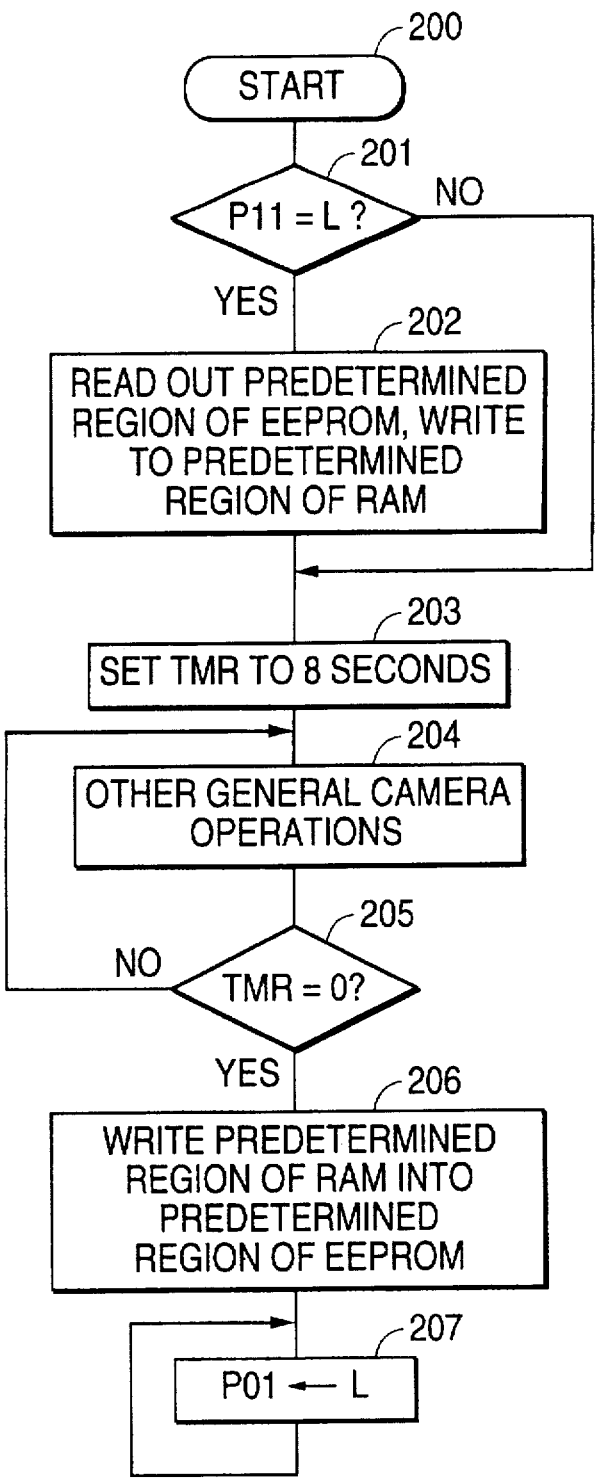
FIG. 5 is a flow chart that shows the operation of the second microcomputer shown in FIG. 2.

Referring now to FIGS. 3–5, these flow charts illustrate the operations of the circuit of the presently preferred embodiment of the present invention as shown in FIG. 2.

First, the operations of MCU 11 will be described using the flow chart of FIG. 3 and the timing chart of FIG. 6. It should be understood that the operations illustrated in the flow charts of FIGS. 3–5 are illustrative of computer operations carried out by the microcomputers of the preferred embodiment of the present invention and according to programs that are written to bring about relevant functionality.

MCU 11 has functions which are reset via power supply voltage being impressed therein. At such time, a program commences execution from step 100 of FIG. 3. At steps 101 and 102, the respective output ports P22 and P23 are set so that they together become or output a "L" level. At step 103 the output port P21 is set to the "L" level thereby allowing power to be supplied to MCU 12, etc..

At step 104, a wait is commenced for 10 msec. After the wait, flow commences at step 105 wherein the output port P23 is set to a high "H" voltage level. The time from step 103 to step 105 corresponds to the time from point a to point b in the timing chart of FIG. 6. In this period a reset command is applied to MCU 12 thereby causing pack Q1 to change over to the ON state.

Thereafter, a wait is carried out at step 106. Thereafter, the output port P22 is set to the "H" level at step 107 (point d in FIG. 6) and at step 108, the input port P31 continues to wait to become the "L" level as shown as a timing loop. At the time point (point m in FIG. 6) at which input port P31 has become the "L" level, flow commences at step 109.

At steps 109 and 110, output ports P23, P22 are set in sequence to the "L" level (point n of FIG. 6). Furthermore, at step 111 output port P21 is set to the "H" level, by interrupting the power supply of MCU 12. At step 112, MCU 12 places itself into a sleep state and the operation of its internal CPU (central processing unit) (not shown) is caused to stop (i.e., a sleep state).

Here, a sleep state is a function arranged in microcomputer MCU 11, etc., in order to suppress power supply current while impressing a power supply voltage on other structures (e.g., MCU 12). While in a state in which it is possible to operate peripheral functions, only the operations of the CPU of MCU 11 are caused to stop, not the extraneous operations of MCU 12, for example. Moreover, the cancellation of the sleep state, other than the reset input of the power supply introduction time, is also canceled by way of an interrupt input via the external interrupt input port INT1 of MCU 11.

Referring now to FIG. 4, therein illustrated is a flow chart showing the interrupt process of MCU 11 started by way of an interrupt input via the interrupt port INT1. The interrupt process is effected by way of MCU 11 responding to a falling edge of the voltage at external interrupt input port INT1.

In particular, when switch SW1 is set to an ON state by a user operation, the external interrupt input port INT1 changes over from the "H" level to the "L" level and, as such, the interrupt routine commences at step 150 in FIG. 4. First, it is determined at step 151 whether or not MCU 11 is in a sleep state. If NO (i.e., MCU 11 is not in a sleep state), a "return" is executed to return operations to the main process illustrated in FIG. 3. If MCU 11 is in a sleep state, flow moves to a RUN state transition as instructed at step 152. The interrupt process returns to the main process shown in FIG. 3 at step 153.

The "RUN state" is a term corresponding to the sleep state status of MCU 11, and is a state in which the CPU of MCU 11 operates normally. Even in a sleep state condition, because the CPU of MCU 11 is permitted to operate only during the execution of an interrupt process, the interrupt process of FIG. 4 is executed to perform those operations. After the interrupt process has returned, the operation of the CPU of MCU 11 in the main routine shown in FIG. 3 is restored via instructing the transition to a RUN state in the interrupt process shown in FIG. 4 (i.e., internal stacks are restored).

After the transition to the sleep state has been instructed in step 112 of the main routine of FIG. 3, i.e., the interrupt process of FIG. 4 by returning, the process recommences from step 103 of FIG. 3 as the next step (i.e., a loop-back to step 103). Moreover, in the timing chart shown in FIG. 6, when installing a battery, the time point at which MCU 11 recommenced operation due to an external interrupt from a sleep state becomes the operation depicted at point a.

Referring now to FIG. 5, therein illustrated is a flow chart of the operations of MCU 12 which responds to the operation of the MCU 11 as indicated above.

MCU 12 is reset by MCU 11 or by the voltage detector 13. After such a reset, the voltage of the reset input terminal RESET becomes the "H" level from the "L" level and operations commence at step 200 and at the point in time when the reset operation was canceled or terminated.

At step 200, a decision is performed to determine if the level of input port P11 is the "L" level. This determination is shown at point c in FIG. 6. Moreover, the delay time from step 200 until the decision is performed in step 201 is necessary so that the wait from when output port P23 of MCU 11 is set to the "H" level until the output port 22 is set to "H" level is shorter than 1 msec.

The delay is necessary to reliably decide, with respect to MCU 12, that the level of the input port P11 is the "L" level when the MCU 12 is reset in response to operation of a switch from a sleep state to another RUN state as discussed above.

In the case that the input port P11 becomes the "L" level, processing proceeds to step 202 wherein a predetermined region of data from EEPROM 14 is continuously (e.g., serially) read out (FIG. 6, point e to point f), and is copied to a predetermined region of a RAM arranged within MCU 12.

On the other hand, in the case that MCU 12 causes a heavy electrical load, not shown in the drawing, its power supply voltage instantaneously falls, as shown in FIG. 6 at point g, and the output terminal OUT of the voltage detector 13 becomes the "L" level. This "L" level signal is input to the reset terminal RESET of MCU 12 to reset MCU 12. Thereafter, the terminal which controls the heavy electrical load which MCU 12 causes, is also reset to a high impedance state. This electrical load becomes light and the power supply voltage of MCU 12 immediately returns to its original voltage. As shown at point h of FIG. 6, the voltage at output terminal OUT of detector 13, namely the reset terminal RESET of MCU 12, thereafter returns to the "H" level.

Where the input port P11 does not take on a "L" level, MCU 12 commences the processing a step 203 corresponding to the point "i" shown in the timing chart of FIG. 6. Namely, MCU 12 does not copy the memory contents of the EEPROM 14 to the RAM of MCU 12, but carries out the process of steps 203–207.

The operations so far discussed with reference to FIG. 5, illustrate that MCU 12 copies to RAM the stored data of EEPROM 14 in the case of a normal reset caused by way of MCU 11 But in the case that an emergency reset has been effected by way of voltage detector 13, the contents of the RAM of MCU 12 are preserved and remain unchanged.

At step 203, MCU 11 commences operation to write a value equivalent to 8 seconds into the timer TMR which is arranged within the microcomputer MCU 11. At step 204, MCU 11 repetitively performs other general processes related to camera operation (not shown in the drawing) until the value of the timer TMR becomes "0" (i.e., until 8 seconds has elapsed). Among the processes related to camera operation are processes which control heavy electrical loads, processes which change the data stored in the RAM, and the like.

The time periods measured or realized by timer TMR are power supply maintenance times. The camera automatically retains the operating state by way of one time operation as set by the user at step 204. The value of the timer TMR is checked at step 205 to be equal to "0." If no time remains, processing proceeds to step 206 wherein the data stored in a predetermined region of the RAM is wholly written into the EEPROM 14 via the serial communication circuit between MCU 12 and EEPROM 14 as shown in FIG. 2 (points j–k of FIG. 6). Finally, at step 207, output port P01 is set to the "L" level and processing within MCU 12 is caused to infinitely loop (point m of FIG. 6). While MCU 12 is caused to infinitely loop, MCU 11 causes power to MCU 12 to be disrupted by setting pack Q1 to an OFF state (point n of FIG. 6). Thereafter, the processes described above may be carried out anew.

By way of the presently preferred embodiment of the present invention, when it has been determined that a normal reset operation has occurred, such as when a power supply of a camera has been turned ON, stored contents of a non-volatile memory are transmitted to a RAM for subsequent camera operation. Additionally, when it has been determined that an emergency reset has occurred, stored contents of a non-volatile memory are not transmitted to a RAM, and the information which had been set directly before a power supply interruption (e.g., when a flash unit previously commenced operation and a temporary battery drain had just occurred) at a previous time are restored at the time of reintroduction of a power supply. As such, the preferred embodiment of the present invention now allows camera option settings to be set and preserved regardless of particular camera operation anomalies that result from power supply interruptions and the like.

Although a preferred embodiment of the present invention has been shown and described, it will be appreciated by those skilled in the art that many changes may be made in the preferred embodiment without departing from the principles and spirit of the invention the scope of which is defined in the appended claims and equivalents thereof.

What is claimed is:

1. An option setting device for use with a camera comprising:

a power supply unit supplying power to the option setting device;

a microcomputer controlling the operations of the camera;

a random access memory (RAM) unit storing option settings set by the microcomputer;

a non-volatile memory unit storing the option settings set by the microcomputer;

a normal reset generation unit generating a normal reset signal to reset the microcomputer after the introduction of power by the power supply unit;

an emergency reset generation unit generating an emergency reset signal to reset the microcomputer after an interruption of power from the power supply unit; and a reset type discrimination unit determining after a reset has occurred whether the reset was caused by the normal reset generation unit or the emergency reset generation unit and only in the case that the reset type discrimination unit determines that the reset was caused by the normal reset generation unit the contents of the non-volatile memory unit are transmitted to the random access memory unit, and in the case that the reset generation type discrimination unit determines that the reset was by the emergency reset generation unit the microcomputer preserves the contents of the random access memory unit without ever transmitting the contents of the non-volatile memory unit to the random access memory unit.

2. The option setting device of claim 1, further comprising:

a switching element providing a power supply to the emergency reset generation unit and wherein the normal reset generation unit outputs the normal reset signal to a reset terminal of the microcomputer when the power supply is introduced and wherein a microcomputer port discriminated by the reset type discrimination unit is set to a normal reset mode, the normal reset generation unit controlling the switching element and providing the power supply to the emergency reset generation unit, the microcomputer, the random access memory (RAM) unit and the non-volatile memory unit, and in the case that the voltage of the power supply unit has been interrupted the emergency reset generation unit outputs the emergency reset signal to a reset terminal of the microcomputer.

3. The option setting device of claim 2, wherein after a specific time from terminating the normal reset signal with respect to the microcomputer, the normal reset generation unit switches to operation by the emergency reset generation unit.

4. A method of operating an option setting device for use with a camera comprising the steps of:

receiving and storing a set of operational options in a non-volatile memory as selected by a camera user;

resetting the option setting device after a power interruption;

determining whether the resetting step was carried out normally or in an emergency;

transmitting the operational options stored during the receiving and storing step to a volatile memory unit of the camera only when it has been determined that the resetting step was carried out normally; and preserving the contents of the volatile memory unit of the camera without ever transmitting the contents of the non-volatile memory unit to the volatile memory unit when it has been determined that the resetting step was carried out in an emergency.

5. The method of claim 4, wherein the resetting step is carried out normally when the camera is turned on and the option setting device receives power.

6. The method of claim 4, wherein the resetting step is carried out in an emergency when power to the option setting device has been interrupted.

7. A device for storing operational settings for use with a camera, the device comprising:

a power supply supplying power to the device;

a volatile memory unit storing the operational settings;

a non-volatile memory unit storing the operational settings;

a first resetting unit generating a first reset signal to reset the device after the power supply has supplied power to the device;

a second resetting unit generating a second reset signal to reset the device after an interruption of power from the power supply; and a reset type discrimination unit determining after a reset has occurred whether the reset was caused by the first or second resetting unit, and only in the case that the reset type discrimination unit determines that the reset was caused by the first resetting unit the contents of the non-volatile memory unit are copied to the volatile memory unit and in the case that the reset type discrimination unit determines that the reset was by the second resetting unit the contents of the non-volatile memory unit are not ever copied to the volatile memory unit.

8. The device according to claim 7, wherein the first resetting unit operates to reset the device when the device is turned ON.

9. The device according to claim 7, wherein the first resetting unit operates in a sleep-state when the second resetting unit operates to reset the device.

10. The device according to claim 7, wherein the volatile memory unit is a random access memory and the non-volatile memory unit is an electrically erasable read-only memory.

11. The device according to claim 7, wherein the first resetting unit is a microcomputer including a random access memory, a read-only memory and a central processing unit.

12. The device according to claim 7, wherein the second resetting unit is a microcomputer including a random access memory, a read-only memory and a central processing unit.

13. The device according to claim 7, wherein the second resetting unit is a voltage discrimination unit.

14. The device according to claim 7, further comprising a switch causing the first resetting unit to cause the second resetting unit to operate.

15. The device according to claim 7, wherein the first resetting unit controls the operation of the second resetting unit.

* * * * *